United States Patent
Caputo et al.

(10) Patent No.: US 11,529,657 B2
(45) Date of Patent: Dec. 20, 2022

(54) METHODS FOR REMOVING AMINE CONTAMINANTS FROM EQUIPMENT USED IN THE PRODUCTION OF POLYETHER POLYOLS

(71) Applicant: Covestro LLC, Pittsburgh, PA (US)

(72) Inventors: Jenna L. Caputo, Monroeville, PA (US); Mark A. Christman, II, Woodsfield, OH (US); Charles D. Starkey, New Martinsville, WV (US); Daniel R. Wagner, Pittsburgh, PA (US); Nigel Barksby, Moon Township, PA (US)

(73) Assignee: Covestro LLC, Pittsburgh, PA (US)

( * ) Notice: Subject to any disclaimer, the term of this patent is extended or adjusted under 35 U.S.C. 154(b) by 0 days.

(21) Appl. No.: 17/196,075

(22) Filed: Mar. 9, 2021

(65) Prior Publication Data

US 2022/0288652 A1  Sep. 15, 2022

(51) Int. Cl.
*B08B 3/08* (2006.01)
*B08B 3/10* (2006.01)
(Continued)

(52) U.S. Cl.
CPC ............ *B08B 3/08* (2013.01); *B08B 3/10* (2013.01); *B08B 9/08* (2013.01); *C08G 65/2696* (2013.01); *C11D 7/08* (2013.01); *C11D 7/265* (2013.01); *C11D 7/34* (2013.01); *C11D 11/0041* (2013.01); *B08B 2203/007* (2013.01)

(58) Field of Classification Search
None
See application file for complete search history.

(56) References Cited

U.S. PATENT DOCUMENTS 2,475,407 A * 7/1949 Sell .......................... A61L 2/00
  134/21
2,662,042 A * 12/1953 Dougherty ............... B08B 9/08
  134/28
(Continued)

FOREIGN PATENT DOCUMENTS

CN 103843817 * 6/2014 ............. A01N 59/00
CN 104384132 A 3/2015
(Continued)

OTHER PUBLICATIONS

DE-102015209355 English translation, accessed on Sep. 2021. (Year: 2016).*
(Continued)

*Primary Examiner* — Eric W Golightly
*Assistant Examiner* — Arlyn I Rivera-Cordero
(74) *Attorney, Agent, or Firm* — Donald R. Palladino (57) ABSTRACT

Methods of removing amine contaminants from equipment used in the production of polyether polyols. These methods include: (a) contacting the equipment with an aqueous solution of a first acid; (b) discharging the aqueous solution of the first acid from the equipment; (c) contacting the equipment with an aqueous solution of an acidic metal conditioner; (d) discharging the aqueous solution of the acidic metal conditioner from the equipment; (e) contacting the equipment with an aqueous solution of an alkali metal hydroxide; and (f) discharging the aqueous solution of the alkali metal hydroxide from the equipment.

16 Claims, 1 Drawing Sheet

(51) Int. Cl.
  *B08B 9/08*   (2006.01)
  *C08G 65/26*  (2006.01)
  *C11D 7/08*   (2006.01)
  *C11D 7/26*   (2006.01)
  *C11D 7/34*   (2006.01)
  *C11D 11/00*  (2006.01)

(56) References Cited

U.S. PATENT DOCUMENTS

| | | | |
|---|---|---|---|
| 3,268,429 A | | 8/1966 | Farrow |
| 3,443,992 A | | 5/1969 | Richard et al. |
| 3,522,093 A | * | 7/1970 | Woolman ............ C11D 11/0041 134/28 |
| 3,865,628 A | | 2/1975 | Callahan et al. |
| 3,985,584 A | | 10/1976 | Chan et al. |
| 3,997,360 A | | 12/1976 | Testa et al. |
| 4,038,473 A | | 7/1977 | Cohen |
| 4,227,946 A | | 10/1980 | Williamson |
| 4,591,391 A | | 5/1986 | Shimizu et al. |
| 4,612,135 A | | 9/1986 | Wenzel |
| 4,731,126 A | | 3/1988 | Dixit et al. |
| 4,863,524 A | | 9/1989 | Komabashiri et al. |
| 5,053,081 A | | 10/1991 | Jacob |
| 5,145,597 A | | 9/1992 | Rodriguez et al. |
| 5,415,799 A | | 5/1995 | Maitz |
| 5,782,989 A | | 7/1998 | Reuter |
| 5,786,405 A | | 7/1998 | Schilling et al. |
| 5,876,511 A | | 3/1999 | Till |
| 6,722,377 B1 | | 4/2004 | Bruce et al. |
| 6,869,543 B2 | | 3/2005 | Anderson et al. |
| 8,530,610 B2 | | 9/2013 | Buijs et al. |
| 2003/0073595 A1 | | 4/2003 | Dorton et al. |
| 2005/0143555 A1 | * | 6/2005 | Nefzger ............... C11D 3/2044 528/272 |
| 2008/0121250 A1 | * | 5/2008 | Fernholz ............. C11D 3/2075 134/3 |
| 2013/0331614 A1 | | 12/2013 | Eleveld et al. |
| 2017/0028449 A1 | * | 2/2017 | Fernholz ............. C11D 3/3947 |
| 2018/0187129 A1 | * | 7/2018 | Traistaru ............ C11D 3/3409 |

FOREIGN PATENT DOCUMENTS

| | | | | |
|---|---|---|---|---|
| DE | 102015209355 A1 | * | 11/2016 | ............ B08B 9/027 |
| EP | 3351612 A1 | | 7/2018 | |
| FR | 2189425 A1 | | 1/1974 | |

OTHER PUBLICATIONS

CN103843817 English translation, accessed on Sep. 2021. (Year: 2014).*

* cited by examiner

METHODS FOR REMOVING AMINE CONTAMINANTS FROM EQUIPMENT USED IN THE PRODUCTION OF POLYETHER POLYOLS

FIELD

This specification relates to methods for removing amine contaminants from equipment used in the production of polyether polyols and to methods and systems for preparing polyether polyols.

BACKGROUND

Polyether polyols, which are often used in the manufacture of polyurethanes, such as polyurethane foams, are often manufactured using a catalyzed reaction of initiators having active hydrogen atoms with epoxides such as, for example, ethylene oxide and/or propylene oxide. Alkalinity is introduced into the polyether polyols, for example, by using alkaline metal hydroxides as catalysts.

Suitable initiators having active hydrogen atoms (sometimes referred to as "H-functional initiators") include hydroxyl group and amine group-containing compounds, and the particular H-functional initiator(s) used can impact various characteristics of the resulting polyether polyol. Amine-initiated polyether polyols, for example, are self-catalyzing and typically react faster with isocyanates (to produce polyurethane) than polyether polyols produced using H-functional initiators containing hydroxyl groups. Therefore, depending on the particular application in which the polyether polyol will be used, it may be desirable to utilize an amine-initiated polyether polyol or it may be desirable to use a hydroxyl-initiated polyether polyol. Amine-initiated polyether polyols may, for example, be particularly desirable for use in the production of rigid insulation foams, whereas hydroxyl-initiated polyether polyols, especially long-chain, relatively low hydroxyl number, polyether polyols, may be particularly desirable for use in the production of flexible foams.

In many cases, therefore, polyether polyol manufacturers produce both amine-initiated and non-amine, i.e., hydroxyl-, initiated polyether polyols. Non-amine initiated polyether polyols are, however, very sensitive to contamination from amines, especially in terms of alkalinity and color. As a result, in many cases, polyether polyol manufacturers have reactors dedicated solely to the production of amine-initiated polyether polyols. To maximize asset utilization, however, it may be desirable to have a single reactor be capable of switching between producing both amine-initiated polyether polyols and non-amine-initiated polyether polyols.

As a result, it would be desirable to provide a process for removing amine contaminants from equipment used in the production of polyether polyols that allows for effective utilization of the equipment, such as a reactor, to produce both amine-initiated and non-amine initiated polyether polyols, with the non-amine initiated polyether polyols exhibiting low alkalinity levels and good color.

SUMMARY

In certain respects, this specification relates to methods of removing amine contaminants from equipment used in the production of polyether polyols. These methods comprise: (a) contacting the equipment with an aqueous solution of a first acid; (b) discharging the aqueous solution of the first acid from the equipment; (c) contacting the equipment with an aqueous solution of an acidic metal conditioner; (d) discharging the aqueous solution of the acidic metal conditioner from the equipment; (e) contacting the equipment with an aqueous solution of an alkali metal hydroxide; and (f) discharging the aqueous solution of the alkali metal hydroxide from the equipment.

In other respects, this specification relates to methods of preparing polyether polyols. These methods comprise: (a) preparing an amine-initiated polyether polyol in a reactor; (b) discharging the amine-initiated polyether polyol from the reactor; (c) cleaning the reactor by a cleaning process comprising: (1) contacting the reactor with an aqueous solution of a first acid; (2) contacting the reactor with an aqueous solution of an acidic metal conditioner; and (3) contacting the reactor with an aqueous solution of an alkali metal hydroxide; and (d) preparing a non-amine initiated polyether polyol in the reactor.

In yet other respects, this specification relates to systems for producing polyether polyols. These systems comprise: (a) a reactor; (b) a source of alkylene oxide in fluid communication with the reactor; (c) a source of alkali metal hydroxide catalyst in fluid communication with the reactor; (d) a source of amine initiator in fluid communication with the reactor; (e) a source of non-amine initiator in fluid communication with the reactor; (f) a water source in fluid communication with the reactor: (g) a source of a strong acid in fluid communication with the reactor; and (h) a source of an acidic metal conditioner in fluid communication with the reactor.

This specification also relates to, among other things, polyether polyols produced using the methods and systems described herein.

BRIEF DESCRIPTION OF THE DRAWINGS

Various features and characteristics of the inventions described in this specification may be better understood by reference to the accompanying FIGURE, in which.

DETAILED DESCRIPTION

Various embodiments are described and illustrated in this specification to provide an overall understanding of the structure, function, properties, and use of the disclosed inventions. It is understood that the various embodiments described and illustrated in this specification are non-limiting and non-exhaustive. Thus, the invention is not limited by the description of the various non-limiting and non-exhaustive embodiments disclosed in this specification. The features and characteristics described in connection with various embodiments may be combined with the features and characteristics of other embodiments. Such modifications and variations are intended to be included within the scope of this specification. As such, the claims may be amended to recite any features or characteristics expressly or inherently described in, or otherwise expressly or inherently supported by, this specification. Further, Applicant(s) reserve the right to amend the claims to affirmatively disclaim features or characteristics that may be present in the prior art. Therefore, any such amendments comply with the requirements of 35 U.S.C. § 112 and 35 U.S.C. § 132(a). The various embodiments disclosed and described in this specification can comprise, consist of, or consist essentially of the features and characteristics as variously described herein.

Any patent, publication, or other disclosure material identified herein is incorporated by reference into this specification in its entirety unless otherwise indicated, but only to the extent that the incorporated material does not conflict with existing definitions, statements, or other disclosure material expressly set forth in this specification. As such, and to the extent necessary, the express disclosure as set forth in this specification supersedes any conflicting material incorporated by reference herein. Any material, or portion thereof, that is said to be incorporated by reference into this specification, but which conflicts with existing definitions, statements, or other disclosure material set forth herein, is only incorporated to the extent that no conflict arises between that incorporated material and the existing disclosure material. Applicant(s) reserves the right to amend this specification to expressly recite any subject matter, or portion thereof, incorporated by reference herein.

In this specification, other than where otherwise indicated, all numerical parameters are to be understood as being prefaced and modified in all instances by the term "about", in which the numerical parameters possess the inherent variability characteristic of the underlying measurement techniques used to determine the numerical value of the parameter. At the very least, and not as an attempt to limit the application of the doctrine of equivalents to the scope of the claims, each numerical parameter described in the present description should at least be construed in light of the number of reported significant digits and by applying ordinary rounding techniques.

Also, any numerical range recited in this specification is intended to include all sub-ranges of the same numerical precision subsumed within the recited range. For example, a range of "1.0 to 10.0" is intended to include all sub-ranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited in this specification is intended to include all lower numerical limitations subsumed therein and any minimum numerical limitation recited in this specification is intended to include all higher numerical limitations subsumed therein. Accordingly, Applicant(s) reserves the right to amend this specification, including the claims, to expressly recite any sub-range subsumed within the ranges expressly recited herein. All such ranges are intended to be inherently described in this specification such that amending to expressly recite any such sub-ranges would comply with the requirements of 35 U.S.C. § 112 and 35 U.S.C. § 132(a).

The grammatical articles "one", "a", "an", and "the", as used in this specification, are intended to include "at least one" or "one or more", unless otherwise indicated. Thus, the articles are used in this specification to refer to one or more than one (i.e., to "at least one") of the grammatical objects of the article. By way of example, "a component" means one or more components, and thus, possibly, more than one component is contemplated and may be employed or used in an implementation of the described embodiments. Further, the use of a singular noun includes the plural, and the use of a plural noun includes the singular, unless the context of the usage requires otherwise.

As earlier indicated, in some implementations, this specification is directed to methods of preparing polyether polyols. Exemplary polyether polyols are polyether polyols and polyether ester polyols.

Figure 1:
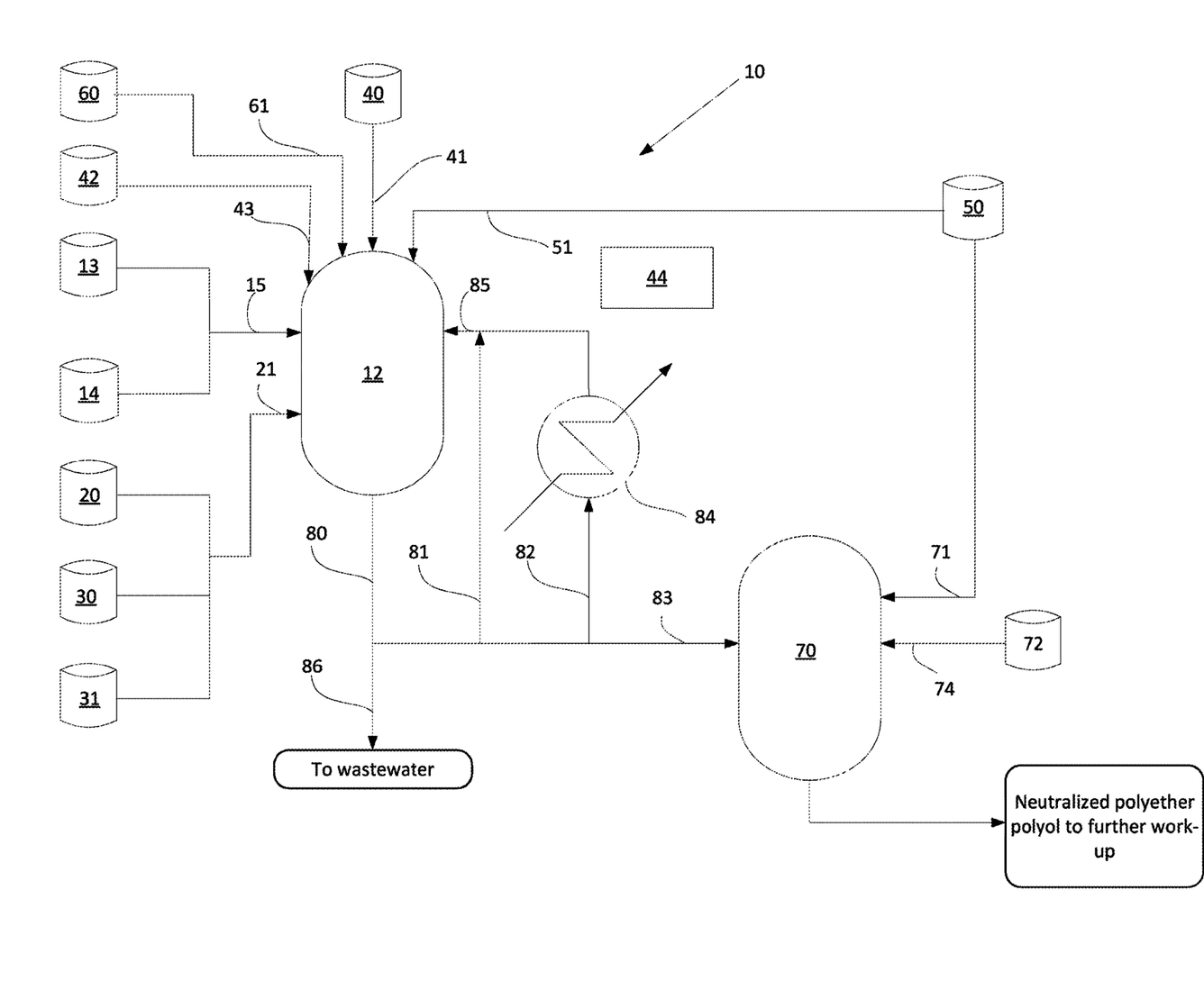
FIG. 1 is an illustration of a system for manufacturing polyether polyols, which is suitable for use in the processes of this specification.

A system for manufacturing polyether polyols, which is suitable for carrying out processes of this specification, is illustrated in FIG. 1, to which reference will now be made. As is seen, system 10 comprises reactor 12. As also illustrated in FIG. 1, system 10 comprises one or more sources of alkylene oxide(s) 13, 14 in fluid communication with an inlet 15 of reactor 12. Suitable alkylene oxides include any of those mentioned below, however, in some implementations, the system comprises a source of propylene oxide 13 and a source of ethylene oxide 14. As illustrated, the ethylene oxide and propylene oxide may be mixed at or prior to reactor inlet 15, though this is not required. In fact, in some implementations it may be desirable to isolate the source of propylene oxide 13 from the source of ethylene oxide 14, which may be accomplished, for example, by dedicated piping or through appropriate valves.

The system 10 also includes a source of catalyst 20 that is in fluid communication with an inlet 21 of reactor 12. Suitable catalysts include any material capable of catalyzing an epoxidation reaction, though, in some implementations, the catalyst source 30 is a source of an alkali metal hydroxide catalyst, such as any of those described below.

The system also includes a source of amine initiator 30 and a source of non-amine initiator 31, each of which are in fluid communication with an inlet 21 of reactor 12. Suitable amine initiators and non-amine initiators include any of those described below. It should be appreciated that, although FIG. 1 depicts only one source of amine initiator 30 and only one source of non-amine initiator 31, more than one such initiator sources is of course possible, particularly where it is desirable that system 10 be capable of producing polyether polyols of various functionalities and molecular weights. Also, though FIG. 1 illustrates the possibility that two or more of amine initiator, non-amine initiator, and catalyst may be combined prior to entering inlet 21, it may, and often is, desirable that the materials are not combined, particularly in the case of amine initiators and non-amine initiators. Therefore, it is of course possible that separate inlets 21 to reactor 12 are provided for each of the initiators and/or catalyst, or that other precautions are taken (such as through valves) to avoid mixing thereof.

The system 10 may also include a reactor pressurization source 40, which may, for example, be a source of feeding pressurized nitrogen to reactor 12 via inlet 41. In addition, system 10 may also include a water source 42 that may be a source of water to reactor 12 via inlet 43, for example. In addition, the system may include a high pressure water source 44, which may provide a source of water having a water pressure of 3500 to 5000 psi, for example.

The system 10 further includes a source of a first acid 50 and a source of an acidic metal conditioner 60. Suitable acids include any of those described below. First acid source may be in fluid communication with reactor 12 via inlet 51. Source of acidic metal conditioner 60 may be in fluid communication with reactor 12 via inlet 61, for example.

The reactor 12 may include discharge line 80 that is in fluid communication with recirculation loop 81, recirculation loop 82, and neutralization feed line 83, in which neutralization feed 83 is in fluid communication with neutralization vessel 70. Recirculation loop 82 may include external heat exchanger 84. Recirculation loops 81 and 82 may be in fluid communication with reactor 12 via inlet 85.

The source of a first acid 50 may also be in fluid communication with neutralization vessel 70, via inlet 71. In addition, water source 72, which may be the same as or different from the water source 42, may be in fluid communication with neutralization vessel 70 via inlet 74. Neutralization vessel 70 may include a discharge line 75, which may be in fluid communication with a system for further work-up of polyether polyol.

As previously indicated, some inventions of this specification comprise preparing an amine-initiated polyether polyol in a reactor. A variety of amine-initiated polyether polyols can be produced according to the methods of this specification. For example, in some implementations, the amine-initiated polyether polyol produced according to the processes of this specification have a functionality of, for example, at least 2, such as 2 to 6, 3 to 5, 3.5 to 4.5 or 3.8 to 4.2 or 3.8 to 4.0. In certain implementations, the amine-initiated polyether polyol has a number average molecular weight of 200 Da to 12,000 Da, such as 200 Da to 1,500 Da, 200 Da to 1,000 Da, 400 Da to 800 Da, 500 Da to 700 Da, or 500 Da to 600 Da. In some embodiments, the amine-initiated polyether polyol produced according to the processes of this specification have a hydroxyl number of 300 to 500 mg KOH/g, 350 to 450 mg KOH/g, or, in some cases, 380 to 420 mg KOH/g.

As used herein, the term "functionality" refers to the average number of reactive hydroxyl groups, —OH, present per molecule of the polyether polyol that is being described. As used herein, the term "OH number" or "hydroxyl number" refers to the number of reactive hydroxyl groups available for reaction, and is expressed as the number of milligrams of potassium hydroxide equivalent to the hydroxyl content of one gram of the polyol, and is determined according to ASTM D4274-16. The term "equivalent weight" refers to the weight of a compound divided by its valence. For a polyol, the equivalent weight is the weight of the polyol that will combine with an isocyanate group, and may be calculated by dividing the molecular weight of the polyol by its functionality. The equivalent weight of a polyol may also be calculated by dividing 56,100 by the hydroxyl number of the polyol–Equivalent Weight (g/eq)=(56.1× 1000)/OH number.

The number average and weight average, $M_n$ and $M_w$, respectively, molecular weights reported herein can be determined by gel-permeation chromatography (GPC) using a method based on DIN 55672-1, employing chloroform as the eluent with a mixed bed column (Agilent PL Gel; SDVB; 3 micron Pore diameter: 1×Mixed-E+5 micron Pore diameter: 2×Mixed-D), refractive index (RI) detection and calibrated with polyethylene glycol as the standard.

Amine-initiated polyether polyols that can be prepared according to certain methods of this specification can prepared by reacting an alkylene oxide with an amine-functional starter compound in the presence of an alkaline catalyst.

Suitable amine-functional starters have an amine functionality of at least 1, such as 1 to 3, or, in some cases, 1 to 2. A primary amine, R—$NH_2$, reacts with epoxides to give two hydroxyl groups. For example, $RNH_2$ can react with 2 moles of ethylene oxide to yield HO—$CH_2CH_2$—NR—$CH_2CH_2$OH. Therefore, an amine functionality of 1 in this case gives a polyol functionality of 2.

Examples of suitable amines include, but are not limited to, aromatic amines, such as crude toluene diamine obtained by the nitration of toluene followed by reduction, 2,3-toluene diamine, 3,4-toluene diamine, 2,4-toluene diamine, and 2,6-toluene diamine or mixtures thereof; aniline; 4,4'-methylene dianiline; methylene-bridged polyphenyl polyamines composed of isomers of methylene dianilines and triamines or polyamines of higher molecular weight prepared by reacting aniline with formaldehyde; ammonia; alkanol amines, such as monoethanol amine, diethanolamine, triethanolamine; aliphatic amines, such as methyl amine, ethylene diamine, diethylene triamine, and triethylene tetramine; and Mannich reaction products of phenol or substituted phenols with alkanol amines and formaldehyde or paraformaldehyde. Mixture of any two more of the foregoing amines may also be used, such as a mixture of 2,3-toluene diamine and 3,4-toluene diamine.

If desired, in addition to the amine-functional starter(s), other H-functional starters may be used to prepare the amine-initiated polyether polyol. In some implementations, for example, such additional starter(s) may comprise trimethylolethane, trimethylolpropane, glycerol, pentaerythritol, 4,4'-dihydroxydiphenyl-propane, sorbitol, sucrose, ethylene glycol, 1,2- or 1,3-propanediol, 1,2-, 1,3- or 1,4-butanediol, 1,5-heptanediol, 1,6-hexanediol, 1,4-cyclohexanedimethanol, 1,4-cyclohexanedimethanol, 1,3-cyclohexanedimethanol, 1,2-cyclohexanedimethanol, tricyclodecanedimethanol, adamantanediol, pentacyclopentadecanedimethanol, glycerin, pentaerythritol, 4,4'-dihydroxy-diphenylpropane, or a mixture of any two or more of the foregoing. Oligomeric and/or polymeric polyols, such as polyether polyols, are also suitable starters, as are Mannich reaction products of phenol or substituted phenols with alkanol amines and formaldehyde or paraformaldehyde.

In some implementations, however, the amine, such as aromatic diamine, such as a toluene diamine (such as ortho-toluene diamine) starter is present in an amount of at least 95% by weight, or, in yet other cases, at least 98% by weight or at least 99% by weight, based on the total weight of H-functional initiator used to prepare the amine-initiated polyether polyol.

Examples of alkylene oxides useful in producing the amine-initiated polyether polyols of certain methods of this specification include, without limitation, ethylene oxide, propylene oxide, butylene oxide, as well as mixtures of any two more thereof. The alkylene oxides may be added as mixtures or added sequentially to produce block copolymers. In some implementations, for example, first about 20-40% of ethylene oxide is added, based on the total amount of alkylene oxide to be added, then about 60-80% of propylene oxide is added, based on the total amount of alkylene oxide to be added.

Any material capable of catalyzing the epoxidation reaction may be used, specific examples of which include, but are not limited to, alkali metal hydroxides with 1 to 4 carbon atoms in the alkyl radical, such as, but not limited to, sodium methylate, sodium and potassium ethylate, potassium isopropylate and sodium butylate, and alkali hydroxides, such as sodium hydroxide, potassium hydroxide and cesium hydroxide. Such catalysts may be used individually or as mixtures of two or more thereof. In certain embodiments, the catalyst is used in an amount of 0.01 to 5 weight percent, 0.2 to 3 weight percent, or, in some cases, 0.1 to 1.0 weight percent, based on the weight of the finished polyether polyol.

The epoxidation reaction can occur by contacting the amine-functional starter with the alkylene oxide(s) at an elevated temperature in the range of, for example, 90 to 180° C. under moderately elevated pressure in the presence of the catalyst.

In the cases of an alkaline-catalyzed epoxidation reaction, after the amine-initiated polyether polyol has been prepared, the resultant reaction mixture that contains the alkaline catalyst is often at least partially neutralized. In some implementations, for example, the amine-initiated polyether polyol is discharged from the reactor.

In certain implementations, the reaction mixture is neutralized with a hydroxy-carboxylic acid, though, as will be appreciated, other acids, such as inorganic acids, including sulfuric acid and/or phosphoric acid, could be used if desired. Neutralization may be accomplished by mixing the acid and reaction mixture at ambient conditions with stirring. Neutralization need not be exact neutrality. The reaction mixture may be maintained at a slight acidity or alkalinity, as desired. In some implementations, the neutralized catalyst is soluble in the polyether polyol so that the resulting amine-initiated polyether polyol may be used in polyurethane foam-forming equipment without subsequent treatment and without generating large amounts of solid waste material.

Examples of hydroxy carboxylic acids useful in the above-described neutralization step include lactic acid, salicylic acid, substituted salicylic acids, such as 2-hydroxy 3-methyl benzoic acid, 2-hydroxy 4-methyl benzoic acid and combinations thereof.

As indicated earlier, in some implementations, the processes of this specification comprise discharging the amine-initiated polyether polyol from the reactor. Various means may be used to discharge the amine-initiated polyether polyol from the reactor, such as by using a pump disposed in discharge line 80 or, as is the cases in the system illustrated in FIG. 1 the amine-initiated polyether polyol may be discharged from reactor 12 by pressurizing reactor 12 by feeding pressurized nitrogen from source 40, which forces the amine-initiated polyether polyol out of reactor 12 via discharge line 80.

Certain implementations of the processes of this specification comprise then cleaning the reactor by a cleaning process comprising: (1) contacting the reactor with an aqueous solution of a first acid; (2) contacting the reactor with an aqueous solution of an acidic metal conditioner; and (3) contacting the reactor with an aqueous solution of an alkali metal hydroxide; and (d) preparing a non-amine initiated polyether polyol in the reactor.

In certain implementations, prior to contacting the reactor with the aqueous solution of the first acid, the reactor may by conditioned to dissolve contaminants, such as residues of amine and/or the amine-initiated polyether polyol, remaining in the reactor following discharge of the amine-initiated polyether polyol. For example, in some implementations, this may be accomplished by charging water to the reactor 12 from water source 42 via inlet 43. Water may be added in an amount to substantially fill the reactor 12. As used herein, "substantially fill" means that sufficient water is added to the reactor to fill at least 50% of the reactor volume. In some cases, sufficient water is added to fill at least 60% or at least 70% of the reactor volume. Heat may then be applied to the reactor 12 such that the water is heated to boiling, i.e., to at least 100° C. The boiling water may then be agitated in the reactor 12 for a desired period of time, such as 30 minutes or more, before the water is discharged from reactor 12 and may, in some cases, be sent to wastewater, via wastewater feed 86. If desired, the foregoing process may be repeated multiple times, such as at least 2 times, at least 3 times, or, in some cases, 3 to 5 times.

In addition, in some implementations, if desired, prior to contacting reactor 12 with the aqueous solution of the first acid, further contaminants may be removed from reactor 12 by applying a high pressure water wash to reactor 12. This may be accomplished, for example, by spraying, via a hose and nozzle, highly pressurized (such as 3500 to 5000 psi) water from high pressure water source 44 into reactor 12. In some implementations, the interior of reactor 12 may by visually inspected (via a manway for example) and high pressure water sprayed into the reactor 12 in areas where visually observable contaminates are present. Water collected in reactor 12 from application of the high pressure water wash may be discharged from reactor 12, such as to wastewater via wastewater feed 86, or it may be allowed to remain in reactor 12 for the subsequent cleaning step.

Next, in some implementations, it may be desirable to apply a water wash to the reactor, as well as connecting piping and equipment, prior to prior to contacting reactor 12 with the aqueous solution of the first acid. This can be accomplished by, for example, substantially completely filling the entire volume of reactor 12 with water, which can be fed to reactor 12 via inlet 43 from water source 42. As used herein, "substantially completely filling" means that water is added to reactor 12 in an amount sufficient to ensure that the top head of reactor 12 is contacted by the water. During the step, the water may be heated, such as to a temperature of at least 60° C. or at least 70° C. and allowed to mix in reactor 12 for a selected time period, such as at least 1 hour, at least 2 hours, or more, before the water is discharged from reactor 12 and may, in some cases, be sent to wastewater, via wastewater feed 86.

As earlier indicated, the cleaning step of processes of this specification comprises contacting the reactor with an aqueous solution of a first acid. Any acid may be used for this purpose, however, in some implementations, the first acid comprises a strong acid. As used herein, the term "strong acid" refers to an acid that has a $pK_a$ of less than about −6.0 at 25° C. The strong acid can be an organic acid or an inorganic acid. Examples of strong acids include p-toluenesulfonic acid, sulfuric acid, hydrochloric acid, hydrobromic acid, nitric acid, trifluoroacetic acid, and perchloric acid. Mixtures of two or more acids can, of course, be used if desired.

In certain implementations, the aqueous solution of first acid used in the processes of this specification is a relatively dilute solution of the acid in water. For example, in some implementations, the aqueous solution of first acid comprises acid in an amount of no more than 5% by weight, such as 0.1 to 5% by weight, 1% to 3 by weight, or, in some cases 1.0% to 2.0% by weight, based on the total weight of the aqueous solution.

The foregoing first acid treatment can be accomplished by, for example, substantially filling (as defined above) or, in some cases, substantially completely filling (as defined above), the volume of reactor 12 with the aqueous solution of first acid, in which the first acid may be fed to reactor 12 via inlet 51 from first acid source 50 and water may be fed to reactor 12 via inlet 43 from water source 42. During the step, the aqueous solution of first acid may be heated, such as to a temperature of at least 30° C. or at least 35° C. and allowed to mix in reactor 12 for a selected time period, such as at least 1 hour, at least 2 hours, or more. In addition, the aqueous solution of first acid may be recirculated by discharging the aqueous solution out of reactor 12 via discharge line 80 and circulating it back to recirculation inlet 85 via line 81 or via line 82, or via both lines 81 and 82, by which the aqueous solution passes through heat exchanger 84, thereby enabled the heat exchanger 84 to be exposed to the first acid treatment. The aqueous solution of first acid may then be discharged from reactor 12 and may, in some cases, be sent to wastewater, via wastewater feed 86.

Next, according to certain implementations of the processes of this specification, reactor 12 is contacted with an aqueous solution of an acidic metal conditioner. As will be appreciated, acidic metal conditioners are often employed to remove oxidation and microscopically roughen a metal surface prior to painting. Acidic metal conditioners typically comprise an acid, such as phosphoric acid, and a surfactant, such as 2-butoxyethanol, ethylene glycol and phosphates. In some implementations, the acidic metal conditioner may comprise 50-60% by weight of phosphoric acid and 10-20% by weight of surfactant, such as 2-butoxyethanol, based on the total weight of the acid metal conditioner.

In some implementations, the acidic metal conditioner may also comprise a corrosion inhibitor. Any of a variety of corrosion inhibitors may be present, such as, for example, nitrogen-bases materials, sulfur-containing compounds, aldehydes, thioaldehydes, acetylenic compounds, and various alkaloids, such as papaverine, strychnine, quinine, and nicotine. A corrosion inhibitor is any component that functions to decrease or prevent the reaction of a metal with the acid that is present in the aqueous solution of acidic metal conditioner.

Any inorganic acid may be used in the acidic metal conditioner. In some implementations, however, the inorganic acid comprises a weak acid. As used herein, the term "weak acid" refers to compounds having a $pK_a$ of greater than 0, such as 0-12, or 6-11 at 25° C. Specific examples of suitable weak inorganic acid include, but are not necessarily limited to, phosphoric acid, hydrofluoric acid, and boric acid.

Acidic metal conditioners suitable for use in the process of this specification are commercially available, one example of which is Oakite® 33, commercially available from Chemetall US, Inc.

In certain implementations, the aqueous solution of acidic metal conditioner used in the processes of this specification comprises is a relatively dilute solution of the acidic metal conditioner in water. For example, in some implementations, the acidic metal conditioner is present in an amount of no more than 5% by weight, such as 0.1 to 5% by weight, 1% to 3 by weight, or, in some cases 1.0% to 2.0% by weight, based on the total weight of the aqueous solution of acidic metal conditioner.

The foregoing acidic metal conditioner treatment can be accomplished by, for example, partially filling the volume of reactor 12 with the aqueous solution of acidic metal conditioner, in which acidic metal conditioner may be fed to reactor 12 via inlet 61 from acidic metal conditioner source 60 and water may be fed to reactor 12 via inlet 43 from water source 42. As used herein, the term "partially filling" means that sufficient aqueous solution of acidic metal conditioner is added to reactor 12 to fill at least 10% of the reactor volume, but, in some cases, less than 50% of the reactor volume, such as, for example, 20 to 40% of the reactor volume. During the step, the aqueous solution of acidic metal conditioner may be heated, such as to a temperature of 30° C. to 40° C. In addition, the aqueous solution of acidic metal conditioner may be recirculated by discharging the aqueous solution out of reactor 12 via discharge line 80 and circulated back to recirculation inlet 85 via line 81 or via line 82 by which the aqueous solution passes through heat exchanger 84, thereby enabled the heat exchanger 84 to be exposed to the acidic metal conditioner treatment. The aqueous solution of acidic metal conditioner may be allowed recirculate to reactor 12 for a selected time period, such as at least 1 hour, at least 2 hours, or more. The aqueous solution of acidic metal conditioner may then be discharged from reactor 12 and may, in some cases, be sent to wastewater, via wastewater feed 86.

Next, in some implementations, reactor 12 may by conditioned to dissolve residues remaining from the foregoing treatments following discharge of the aqueous solution of acidic metal conditioner. For example, in some implementations, water may be charged to reactor 12 from water source 42 via inlet 43. Water may be added in an amount to substantially fill the reactor 12 (as defined above). In some cases, sufficient water is added to fill at least 60% or at least 70% of the reactor volume. Heat may then be applied to the reactor 12 such that the water is heated to boiling, i.e., to at least 100° C. The boiling water may then be agitated in the reactor 12 for a desired period of time, such as 30 minutes or more, before the water is discharged from reactor 12 and may, in some cases, be sent to wastewater, via wastewater feed 86. If desired, the foregoing process may be repeated multiple times, such as at least 2 times, at least 3 times, or, in some cases, 3 to 5 times.

Next, according to implementations of the processes of this specification, reactor 12 is contacted with an aqueous solution of an alkali metal hydroxide. As used herein, the term "aqueous solution of an alkali metal hydroxide" refers to a solution comprising an alkali metal hydroxide and water.

Any alkali metal hydroxide may be used, however, in some implementations, the alkali metal hydroxide used comprises an alkali metal hydroxide that is also used as a catalyst in the epoxidation reaction that produces the amine-initiated polyether polyol and/or the non-amine-initiated polyether polyol that is made in reactor 12. As a result, in some implementations, the aqueous solution of alkali metal hydroxide is created in reactor 12 by feeding an alkali metal hydroxide catalyst (which may itself comprise a solution of alkali metal hydroxide and water) to reactor 12 via inlet 21 from catalyst source 20 and water may be fed to reactor 12 via inlet 43 from water source 42. Specific examples of suitable alkali metal hydroxides include, for example, sodium hydroxide, potassium hydroxide and cesium hydroxide.

In certain implementations, the aqueous solution of alkali metal hydroxide used in the processes of this specification is a relatively dilute solution of an alkali metal hydroxide in water. For example, in some implementations, the aqueous solution of alkali metal hydroxide comprises an alkali metal hydroxide in an amount of no more than 5% by weight, such as 0.1 to 5% by weight, 0.1% to 1 by weight, or, in some cases 0.3% to 0.6% by weight, based on the total weight of the aqueous solution.

The foregoing alkaline treatment can be accomplished by, for example, at least partially filling (defined above) or substantially filling (defined above) the volume of reactor 12 with an aqueous solution of alkali metal hydroxide, in which the alkali metal hydroxide may be fed to reactor 12 via inlet 21 from catalyst source 20 and water may be fed to reactor 12 via inlet 43 from water source 42. During the step, the aqueous solution of alkali metal hydroxide may be mixed and, if desired, heated in reactor 12, such as to a temperature of, for example, up to 50° C. In addition, the aqueous solution of alkali metal hydroxide may be recirculated by discharging the aqueous solution out of reactor 12 via discharge line 80 and circulated back to recirculation inlet 85 via line 81 or via line 82 by which the aqueous solution passes through heat exchanger 84, thereby enabled the heat exchanger 84 to be exposed to the alkaline treatment. The aqueous solution of alkali metal hydroxide may be mixed in reactor 12 for a selected time period, such as at least 15 minutes or at least 30 minutes. The aqueous solution of alkali metal hydroxide may then be discharged from reactor 12 and may, in some cases, be sent to wastewater, via wastewater feed 86.

Next, in some implementations, it may be desirable to again condition reactor 12 by removing residues remaining from the foregoing alkaline treatment following discharge of the aqueous solution of alkali metal hydroxide from reactor 12. For example, in some implementations, this may be accomplished by charging water to the reactor 12 from water source 42 via inlet 43. Water may be added in an amount to substantially fill the reactor 12 (as defined above). In some cases, sufficient water is added to fill at least 60% or at least 70% of the reactor volume. Heat may then be applied to the reactor 12 such that the water is heated to boiling, i.e., to at least 100° C. The boiling water may then be agitated in the reactor 12 for a desired period of time, such as 30 minutes or more, before the water is discharged from reactor 12 and may, in some cases, be sent to wastewater, via wastewater feed 86. If desired, the foregoing process may be repeated multiple times, such as at least 2 times, at least 3 times, or, in some cases, 3 to 5 times. In some cases, the wastewater may be analyzed for nitrogen content to determine the number of times to repeat this step. Ideally, the process is complete when no detectable nitrogen remains.

It has been discovered that the foregoing cleaning process can sufficiently eliminate amine contamination in a polyether reactor, such that the reactor is capable of being used to produce both amine-initiated polyether polyols and non-amine-initiated polyether polyols effectively. In other words, it is possible to produce non-amine initiated polyether polyols in the reactor without negatively impacted the color and alkalinity of the polyether polyol.

As a result, some implementations of the processes of this specification comprise preparing a non-amine initiated polyether polyol in the reactor. The non-amine initiated polyether polyols subject to the processes of the present invention can be prepared, for example, by a procedure in which one or more alkylene oxides having from 2 to 10 carbon atoms in the alkylene radical, such as 2 to 6 carbon atoms in the alkylene radical, and which are optionally substituted, are added to a starter molecule that contains at least 2, such as 2 to 8, or, in some cases, 2 to 4 active hydrogen atoms, in the presence of an alkaline catalyst. The processes of the present invention are suitable for removing water from a wide range of polyether polyols, in terms of their functionality, molecular weight and OH number. In certain embodiments, however, the processes of the present invention are particularly advantageous for use in connection with preparing non-amine initiated polyether polyols that have a number average molecular weight of at least 700 Da, such as 700 Da to 12,000 Da, or, in some cases, 1000 to 12,000 Da, and a hydroxyl number of 28 to 150 mg KOH/gram.

Suitable alkylene oxides for preparing such non-amine initiated polyether polyols include, but are not limited to, butylene oxide, styrene oxide, ethylene oxide and propylene oxide. The alkylene oxides may be used individually, sequentially or as mixtures of two or more thereof. In certain embodiments, however, the processes of the present invention are particularly advantageous for use in connection with preparing non-amine initiated "active" polyether polyols, which, as used herein, refers to an ethylene oxide capped polyether polyol having terminal primary hydroxyl groups.

Suitable starter molecules for preparing such polyether polyols include polyols (including monomeric, oligomeric, and polymeric polyols), such as trimethylolethane, trimethylolpropane, glycerol, pentaerythritol, 4,4'-dihydroxydiphenyl-propane, sorbitol, sucrose, ethylene glycol, 1,2- or 1,3-propanediol, 1,2-, 1,3- or 1,4-butanediol, 1,5-heptanediol, 1,6-hexanediol, 1,4-cyclohexanedimethanol, 1,4-cyclohexanedimethanol, 1,3-cyclohexanedimethanol, 1,2-cyclohexanedimethanol, tricyclodecanedimethanol, adamantanediol, pentacyclopentadecanedimethanol, glycerin, pentaerythritol, 4,4'-dihydroxy-diphenylpropane, or a mixture of any two or more of the foregoing. Oligomeric and/or polymeric polyols, such as polyether polyols, are also suitable starters. As will be appreciated, however, the non-amine initiated polyether polyols do not utilize a starter that has amine functionality.

In some implementations, an alkaline catalyst is used to prepare the non-amine initiated polyether polyol. Examples of such catalysts are alkali metal hydroxides with 1 to 4 carbon atoms in the alkyl radical, such as, but not limited to, sodium methylate, sodium and potassium ethylate, potassium isopropylate and sodium butylate, and alkali hydroxides, such as sodium hydroxide, potassium hydroxide and cesium hydroxide. Such catalysts may be used individually or as mixtures of two or more thereof. In certain embodiments, the catalyst is used in an amount of 0.01 to 5 weight percent, 0.2 to 3 weight percent, or, in some cases, 0.1 to 1.0 weight percent, based on the overall weight of the total reactant charge.

In some embodiments, the alkaline catalyst is neutralized in the presence of water. In certain cases, prior to any subsequent distillation, water is present in an amount of 1% to 15% by weight, such as 3% to 13% by weight, or, in some cases, 4% to 10% by weight or 4% to 8% by weight, based on the total weight of polyether polyol present.

In certain implementations, the alkaline catalyst is neutralized with an acid. Examples of suitable acids include, but are not limited to, sulfuric acid, phosphoric acid, carbonic acid, tartaric acid, lactic acid, acetic acid, citric acid, and DDBSA (dodecylbenzene sulfonic acid). The amount of acid employed is, in certain embodiments, from 0.3 to 1.5 equivalents of acid per equivalent of alkaline catalyst, such as 0.9 to 1.2 equivalent of acid per equivalent of alkaline catalyst, or, in some cases, 1.0 to 1.1 equivalent of acid per equivalent of alkaline catalyst.

After the crude polyol neutralization has ended, it may be desirable to add an antioxidant. Many antioxidants, especially those having phenolic hydroxyl groups, impart an unwanted color to alkaline crude polyols; therefore, they are usually added only after neutralization.

In some implementations, the removal of salts via filtration or sedimentation is preceded by, or conducted concurrently with, a distillation step to remove water. In some implementations, water is removed first under standard pressure and later under reduced pressure until pressure and temperature values where the residual water content in the polyol is within the specified limits have been attained, for example with the combination of a pressure of 5 mbar and a temperature of 120° C. Such a distillation can also be interrupted for conduction of the filtration step, for example prior to entry into the reduced pressure phase. In this procedure, the fine distillation is conducted only after the filtration. The small amounts of water that remain after the standard pressure distillation are generally entirely soluble in the polyols, and so the salt at this time has already crystallized out virtually completely. Sometimes, quantitative salt formation is even possible virtually completely without removal of the water, for example when polyols having low equivalent molar masses are being worked up, these being entirely miscible with large amounts of water. In the workup process, it is also possible to promote salt removal via filtration through adsorbents. It may be advantageous to add such adsorbents prior to or during the removal of water, since they may be particularly effective when the polyol still has a certain water content. Adsorbents suitable for this purpose are, for example, sheet silicates (bentonite, attapulgite), diatomaceous earth (Celite) and synthetic magnesium silicate, such as AMBOSOL® or BriteSorb®.

In some implementations, the removal of the salt particles is effected via filtration and can be accomplished with the aid of a wide variety of different filtration apparatuses. On the industrial scale, what are called precoat filtrations are frequently conducted, in which the filtercake itself acts as the effective filter layer. In that case, the polyol containing salt particles is generally at first guided in circulation through the filtration apparatus until a filter cake having sufficient depth filter action has formed ("cloudy run time"), before the product, which then filters through as a clear liquid, is transferred into the final receiver. To promote the filtercake formation, a small amount of a filtration aid, for example cellulose fibers, can be added to the circulating polyol containing salt particles. Performance of such filtrations is frequently accomplished using candle filters, plate pressure filters or plate filters. Filtration operations can be optimized by the adjustment of process parameters, for example a sufficiently high pressure differential across the filter layer and a suitable viscosity controllable via the temperature. It will be appreciated that the removal of the neutralization salts formed is not restricted to the option of filtration, but can be undertaken by other methods, such as particle sedimentation, centrifugation or the like.

For salt-free and stabilized polyols which have been worked up to completion, handling and storage with exclusion of oxygen is often recommended. Inert gases suitable for this purpose are, for example, noble gases, nitrogen or carbon dioxide. The prevention of ingress of oxygen very substantially prevents product discoloration; especially at elevated temperatures, which are generally utilized to facilitate the handling of the finished products through lowering of the product viscosity. Furthermore, under an inert gas atmosphere, a much lower level of peroxide groups also arises, these contributing to cleavage of polyether chains to form further low molecular weight oxidative degradation products.

The amine-initiated and non-amine initiated polyether polyols described in this specification may be used in a variety of applications. For example, such polyols may be reacted with one or more isocyanates to provide polyurethane products including, but not limited to, coatings, adhesives, sealants, elastomers, foams, including flexible foams, and the like. Suitable organic polyisocyanates for forming such polyurethanes include unmodified isocyanates, modified polyisocyanates, and isocyanate prepolymers. Such organic polyisocyanates include aliphatic, cycloaliphatic, araliphatic, aromatic, and heterocyclic polyisocyanates of the type described, for example, by W. Siefken in Justus Liebigs Annalen der Chemie, 562, pages 75 to 136. Examples of such isocyanates include those represented by the formula:

Q(NCO)n in which n is a number from 2-5, such as 2-3, and Q is an aliphatic hydrocarbon group; a cycloaliphatic hydrocarbon group; an araliphatic hydrocarbon group; or an aromatic hydrocarbon group.

As should be apparent from the foregoing description, in some respects, this specification relates to methods of removing amine contaminants from equipment used in the production of polyether polyols. These methods comprise: (a) contacting the equipment with an aqueous solution of a first acid; (b) discharging the aqueous solution of the first acid from the equipment; (c) contacting the equipment with an aqueous solution of an acidic metal conditioner; (d) discharging the aqueous solution of the acidic metal conditioner from the equipment; (e) contacting the equipment with an aqueous solution of an alkali metal hydroxide; and (f) discharging the aqueous solution of the alkali metal hydroxide from the equipment.

As should also be apparent from the foregoing description, in some respects, this specification relates to systems for producing polyether polyols. These systems comprise: (a) a reactor; (b) a source of alkylene oxide in fluid communication with the reactor; (c) a source of alkali metal hydroxide catalyst in fluid communication with the reactor; (d) a source of amine initiator in fluid communication with the reactor; (e) a source of non-amine initiator in fluid communication with the reactor; (f) a water source in fluid communication with the reactor: (g) a source of a strong acid in fluid communication with the reactor; and (h) a source of an acidic metal conditioner in fluid communication with the reactor.

Various aspects of the subject matter described in this specification are set out in the following numbered clauses:

Clause 1. A method of removing amine contaminants from equipment used in the production of polyether polyols, comprising: (a) contacting the equipment with an aqueous solution of a first acid; (b) discharging the aqueous solution of the first acid from the equipment; (c) contacting the equipment with an aqueous solution of an acidic metal conditioner; (d) discharging the aqueous solution of the acidic metal conditioner from the equipment; (e) contacting the equipment with an aqueous solution of an alkali metal hydroxide; and (f) discharging the aqueous solution of the alkali metal hydroxide from the equipment.

Clause 2. The method of clause 1, wherein the equipment comprises a reactor that produces amine-initiated polyether polyol and non-amine initiated polyether polyol.

Clause 3. The method of clause 1, wherein the amine-initiated polyether polyol has a functionality of at least 2, 2 to 6, 3 to 5, 3.5 to 4.5, 3.8 to 4.2 or 3.8 to 4.0; a number average molecular weight of 200 Da to 12,000 Da, 200 Da to 1,500 Da, 200 Da to 1,000 Da, 400 Da to 800 Da, 500 Da to 700 Da, or 500 Da to 600 Da; and a hydroxyl number of 300 to 500 mg KOH/g, 350 to 450 mg KOH/g, or, 380 to 420 mg KOH/g.

Clause 4. The method of clause 2 or clause 3, wherein the non-amine initiated polyether polyol has a functionality of at least 2, 2 to 8, or, 2 to 4; a number average molecular weight of at least 700 Da, 700 Da to 12,000 Da, or 1000 to 12,000; and a hydroxyl number of 28 to 150 mg KOH/gram.

Clause 5. The method of any one of clause 2 to clause 4, wherein the amine-initiated polyether polyol is the reaction product of an alkylene oxide with an amine-functional starter compound, wherein the amine-functional starter has an amine functionality of at least 1, 1 to 3, or 1 to 2, such as where the amine-functional starter comprises an aromatic amine, such as a toluene diamine, aniline, 4,4'-methylene dianiline, a methylene-bridged polyphenyl polyamine, ammonia, an alkanol amine, such as monoethanol amine, diethanolamine, and triethanolamine, an aliphatic amine, such as methyl amine, ethylene diamine, diethylene triamine, and triethylene tetramine, a Mannich reaction product of phenol or substituted phenol with an alkanol amine and formaldehyde or paraformaldehyde, or a mixture of any two or more thereof.

Clause 6. The method of any one of clause 2 to clause 5, wherein the amine, such as aromatic diamine, such as a toluene diamine (such as ortho-toluene diamine) starter is present in an amount of at least 95% by weight or at least 98% by weight or at least 99% by weight, based on the total weight of H-functional initiator used to prepare the amine-initiated polyether polyol.

Clause 7. The method of clause 5 or clause 6, wherein the alkylene oxide used to produce the amine-initiated polyether polyol comprises ethylene oxide, propylene oxide, butylene oxide, or a mixture of any two more thereof.

Clause 8. The method of any one of clause 2 to clause 7, wherein the non-amine initiated polyether polyol is the reaction product of an alkylene oxide having 2 to 10 or 2 to 6 carbon atoms in the alkylene radical and an H-functional starter comprising at least 2, 2 to 8, or 2 to 4 active hydrogen atoms (with the proviso that the H-functional starter does not comprise a starter that has amine functionality), in the presence of an alkaline catalyst, such as where the alkylene oxide comprises butylene oxide, styrene oxide, ethylene oxide, propylene oxide, or a mixture of any two or more thereof and the H-functional starter comprises trimethylolethane, trimethylolpropane, glycerol, pentaerythritol, 4,4'-dihydroxydiphenyl-propane, sorbitol, sucrose, ethylene glycol, 1,2- or 1,3-propanediol, 1,2-, 1,3- or 1,4-butanediol, 1,5-heptanediol, 1,6-hexanediol, 1,4-cyclohexanedimethanol, 1,4-cyclohexanedimethanol, 1,3-cyclohexanedimethanol, 1,2-cyclohexanedimethanol, tricyclodecanedimethanol, adamantanediol, pentacyclopentadecanedimethanol, glycerin, pentaerythritol, 4,4'-dihydroxy-diphenylpropane, or a mixture of any two or more thereof the foregoing, and such as where the alkaline catalyst comprises an alkali hydroxide, such as sodium hydroxide, potassium hydroxide, cesium hydroxide, or a mixture of any two or more thereof.

Clause 9. The method of any one of clause 1 to clause 8, further comprising, prior to contacting the equipment with the aqueous solution of the first acid, substantially filling the equipment with water and heating the water to boiling.

Clause 10. The method of any one of clause 1 to clause 9, further comprising, prior to contacting the equipment with the aqueous solution of the first acid, removing contaminants from the equipment by applying a high pressure water wash to the equipment, such as by spraying water pressurized to 3500 to 5000 psi into the equipment.

Clause 11. The method of any one of clause 1 to clause 10, further comprising, prior to prior to contacting the equipment with the aqueous solution of the first acid, substantially completely filling the entire volume of the equipment with water, such as where the water is heated to a temperature of at least 60° C. or at least 70° C.

Clause 12. The method of any one of clause 1 to clause 11, wherein the aqueous solution of the first acid comprises an acid that has a pKa of less than about −6.0 at 25° C., such as where the acid comprises p-toluenesulfonic acid, sulfuric acid, hydrochloric acid, hydrobromic acid, nitric acid, trifluoroacetic acid, perchloric acid, or a mixture of any two or more thereof.

Clause 13. The method of any one of clause 1 to clause 12, wherein the aqueous solution of first acid comprises acid in an amount of no more than 5% by weight, 0.1 to 5% by weight, 1% to 3 by weight, or, 1.0% to 2.0% by weight, based on the total weight of the aqueous solution.

Clause 14. The method of any one of clause 1 to clause 13, wherein the contacting the equipment with the aqueous solution of first acid comprises substantially filling or substantially completely filling the volume of the equipment with the aqueous solution of first acid and heating the aqueous solution of first acid to a temperature of at least 30° C. or at least 35° C.

Clause 15. The method of any one of clause 1 to clause 14, wherein the acidic metal conditioner comprises an acid and a surfactant, such as 2-butoxyethanol, ethylene glycol, a phosphates, or a mixture thereof.

Clause 16. The method of clause 15, wherein the acidic metal conditioner comprises 50-60% by weight of acid, such as phosphoric acid, and 10-20% by weight of surfactant, such as 2-butoxyethanol, based on the total weight of the acid metal conditioner.

Clause 17. The method of clause 15 or clause 16, wherein the acidic metal conditioner further comprises a corrosion inhibitor, such as a nitrogen-bases material, sulfur-containing compound, an aldehyde, a thioaldehyde, an acetylenic compound, an alkaloid, such as papaverine, strychnine, quinine, and nicotine, or a mixture of any two or more thereof.

Clause 18. The method of any one of clause 15 to clause 17, wherein the acid comprises a weak inorganic acid having a pKa of greater than 0, 0 to 12, or 6 to 11 at 25° C., such as phosphoric acid, hydrofluoric acid, boric acid, or a mixture of any two or more thereof.

Clause 19. The method of any one of clause 1 to clause 18, wherein the acidic metal conditioner is present in the aqueous solution of acidic metal conditioner in an amount of no more than 5% by weight, 0.1 to 5% by weight, 1% to 3 by weight, or 1.0% to 2.0% by weight, based on the total weight of the aqueous solution of acidic metal conditioner.

Clause 20. The method of any one of clause 1 to clause 19, wherein the contacting the equipment with an aqueous solution of an acidic metal conditioner comprises partially filling the volume of the equipment with the aqueous solution of acidic metal conditioner, wherein the aqueous solution of acidic metal conditioner is heated to a temperature of 30° C. to 40° C.

Clause 21. The method of any one of clause 1 to clause 20, wherein, following discharge of the aqueous solution of the acidic metal conditioner from the equipment, water is added in an amount to substantially fill the equipment and the water heated to boiling.

Clause 22. The method of any one of clause 2 to clause 21, wherein the alkali metal hydroxide present in the aqueous solution of an alkali metal hydroxide comprises an alkali metal hydroxide that is used as a catalyst in an epoxidation reaction that produces the amine-initiated polyether polyol and/or the non-amine-initiated polyether polyol made in the reactor.

Clause 23. The method of any one of clause 1 to clause 22, wherein the alkali metal hydroxide comprises sodium hydroxide, potassium hydroxide, cesium hydroxide, or a mixture of any two or more thereof.

Clause 24. The method of any one of clause 1 to clause 23, wherein alkali metal hydroxide is present in the aqueous solution of alkali metal hydroxide in an amount of no more than 5% by weight, 0.1 to 5% by weight, 0.1% to 1 by weight, or 0.3% to 0.6% by weight, based on the total weight of the aqueous solution.

Clause 25. The method of any one of clause 1 to clause 24, wherein the contacting the equipment with an aqueous solution of an alkali metal hydroxide comprises at least partially filling or substantially filling the volume of the equipment with the aqueous solution of alkali metal hydroxide.

Clause 26. The method of any one of clause 1 to clause 25, further comprising, after contacting the equipment with the aqueous solution of an alkali metal hydroxide, adding water to the equipment in an amount to fill at least 60% or at least 70% of the equipment volume and heating the water to boiling.

Clause 27. A method of preparing polyether polyols, comprising: (a) preparing an amine-initiated polyether polyol in a reactor; (b) discharging the amine-initiated polyether polyol from the reactor; (c) cleaning the reactor by a cleaning process comprising: (1) contacting the reactor with an aqueous solution of a first acid; (2) contacting the reactor with an aqueous solution of an acidic metal conditioner; and (3) contacting the reactor with an aqueous solution of an alkali metal hydroxide; and (d) preparing a non-amine initiated polyether polyol in the reactor.

Clause 28. The method of clause 27, wherein the amine-initiated polyether polyol has a functionality of at least 2, 2 to 6, 3 to 5, 3.5 to 4.5, 3.8 to 4.2 or 3.8 to 4.0; a number average molecular weight of 200 Da to 12,000 Da, 200 Da to 1,500 Da, 200 Da to 1,000 Da, 400 Da to 800 Da, 500 Da to 700 Da, or 500 Da to 600 Da; and a hydroxyl number of 300 to 500 mg KOH/g, 350 to 450 mg KOH/g, or, 380 to 420 mg KOH/g.

Clause 29. The method of clause 27 or clause 28, wherein the non-amine initiated polyether polyol has a functionality of at least 2, 2 to 8, or, 2 to 4; a number average molecular weight of at least 700 Da, 700 Da to 12,000 Da, or 1000 to 12,000; and a hydroxyl number of 28 to 150 mg KOH/gram.

Clause 30. The method of any one of clause 27 to clause 29, wherein the amine-initiated polyether polyol is the reaction product of an alkylene oxide with an amine-functional starter compound, wherein the amine-functional starter has an amine functionality of at least 1, 1 to 3 or, 1 to 2, such as where the amine-functional starter comprises an aromatic amine, such as a toluene diamine, aniline, 4,4'-methylene dianiline, a methylene-bridged polyphenyl polyamine, ammonia, an alkanol amine, such as monoethanol amine, diethanolamine, and triethanolamine, an aliphatic amine, such as methyl amine, ethylene diamine, diethylene triamine, and triethylene tetramine, a Mannich reaction product of phenol or substituted phenol with an alkanol amine and formaldehyde or paraformaldehyde, or a mixture of any two or more thereof.

Clause 31. The method of any one of clause 27 to clause 30, wherein the amine, such as aromatic diamine, such as a toluene diamine (such as ortho-toluene diamine) starter is present in an amount of at least 95% by weight, at least 98% by weight or at least 99% by weight, based on the total weight of H-functional initiator used to prepare the amine-initiated polyether polyol.

Clause 32. The method of clause 30 or clause 31, wherein the alkylene oxide used to produce the amine-initiated polyether polyol comprises ethylene oxide, propylene oxide, butylene oxide, or a mixture of any two more thereof.

Clause 33. The method of any one of clause 27 to clause 32, wherein the non-amine initiated polyether polyol is the reaction product of an alkylene oxide having 2 to 10 or 2 to 6 carbon atoms in the alkylene radical and an H-functional starter comprising at least 2, 2 to 8, or 2 to 4 active hydrogen atoms (with the proviso that the H-functional starter does not comprise a starter that has amine functionality), in the presence of an alkaline catalyst, such as where the alkylene oxide comprises butylene oxide, styrene oxide, ethylene oxide, propylene oxide, or a mixture of any two or more thereof and the H-functional starter comprises trimethylolethane, trimethylolpropane, glycerol, pentaerythritol, 4,4'-dihydroxydiphenyl-propane, sorbitol, sucrose, ethylene glycol, 1,2- or 1,3-propanediol, 1,2-, 1,3- or 1,4-butanediol, 1,5-heptanediol, 1,6-hexanediol, 1,4-cyclohexanedimethanol, 1,4-cyclohexanedimethanol, 1,3-cyclohexanedimethanol, 1,2-cyclohexanedimethanol, tricyclodecanedimethanol, adamantanediol, pentacyclopentadecanedimethanol, glycerin, pentaerythritol, 4,4'-dihydroxy-diphenylpropane, or a mixture of any two or more thereof the foregoing, and such as where the alkaline catalyst comprises an alkali hydroxide, such as sodium hydroxide, potassium hydroxide, cesium hydroxide, or a mixture of any two or more thereof.

Clause 34. The method of any one of clause 27 to clause 33, further comprising, prior to contacting the reactor with the aqueous solution of the first acid, substantially filling the reactor with water and heating the water to boiling.

Clause 35. The method of any one of clause 27 to clause 34, further comprising, prior to contacting the reactor with the aqueous solution of the first acid, removing contaminants from the reactor by applying a high pressure water wash to the equipment, such as by spraying water pressurized to 3500 to 5000 psi into the reactor.

Clause 36. The method of any one of clause 27 to clause 35, further comprising, prior to prior to contacting the reactor with the aqueous solution of the first acid, substantially completely filling the entire volume of the reactor with water, such as where the water is heated to a temperature of at least 60° C. or at least 70° C.

Clause 37. The method of any one of clause 27 to clause 36, wherein the aqueous solution of the first acid comprises an acid that has a pKa of less than about −6.0 at 25° C., such as where the acid comprises p-toluenesulfonic acid, sulfuric acid, hydrochloric acid, hydrobromic acid, nitric acid, trifluoroacetic acid, perchloric acid, or a mixture of any two or more thereof.

Clause 38. The method of any one of clause 27 to clause 37, wherein the aqueous solution of first acid comprises acid in an amount of no more than 5% by weight, 0.1 to 5% by weight, 1% to 3 by weight, or, 1.0% to 2.0% by weight, based on the total weight of the aqueous solution.

Clause 39. The method of any one of clause 27 to clause 38, wherein the contacting the reactor with the aqueous solution of first acid comprises substantially filling or substantially completely filling the volume of the reactor with the aqueous solution of first acid and heating the aqueous solution of first acid to a temperature of at least 30° C. or at least 35° C.

Clause 40. The method of any one of clause 27 to clause 39, wherein the acidic metal conditioner comprises an acid and a surfactant, such as 2-butoxyethanol, ethylene glycol, a phosphates, or a mixture thereof.

Clause 41. The method of clause 40, wherein the acidic metal conditioner comprises 50-60% by weight of acid, such as phosphoric acid, and 10-20% by weight of surfactant, such as 2-butoxyethanol, based on the total weight of the acid metal conditioner.

Clause 42. The method of clause 40 or clause 41, wherein the acidic metal conditioner further comprises a corrosion inhibitor, such as a nitrogen-bases material, sulfur-containing compound, an aldehyde, a thioaldehyde, an acetylenic compound, an alkaloid, such as papaverine, strychnine, quinine, and nicotine, or a mixture of any two or more thereof.

Clause 43. The method of any one of clause 40 to clause 42, wherein the acid comprises a weak inorganic acid having a pKa of greater than 0, 0 to 12, or 6 to 11 at 25° C., such as phosphoric acid, hydrofluoric acid, boric acid, or a mixture of any two or more thereof.

Clause 44. The method of any one of clause 27 to clause 43, wherein the acidic metal conditioner is present in the aqueous solution of acidic metal conditioner in an amount of no more than 5% by weight, 0.1 to 5% by weight, 1% to 3 by weight, or 1.0% to 2.0% by weight, based on the total weight of the aqueous solution of acidic metal conditioner.

Clause 45. The method of any one of clause 27 to clause 44, wherein the contacting the reactor with an aqueous solution of an acidic metal conditioner comprises partially filling the volume of the reactor with the aqueous solution of acidic metal conditioner, wherein the aqueous solution of acidic metal conditioner is heated to a temperature of 30° C. to 40° C.

Clause 46. The method of any one of clause 27 to clause 45, wherein, following discharge of the aqueous solution of the acidic metal conditioner from the reactor, water is added in an amount to substantially fill the reactor and the water heated to boiling.

Clause 47. The method of any one of clause 27 to clause 46, wherein the alkali metal hydroxide present in the aqueous solution of an alkali metal hydroxide comprises an alkali metal hydroxide that is used as a catalyst in an epoxidation reaction that produces the amine-initiated polyether polyol and/or the non-amine-initiated polyether polyol made in the reactor.

Clause 48. The method of any one of clause 27 to clause 47, wherein the alkali metal hydroxide comprises sodium hydroxide, potassium hydroxide, cesium hydroxide, or a mixture of any two or more thereof.

Clause 49. The method of any one of clause 27 to clause 48, wherein alkali metal hydroxide is present in the aqueous solution of alkali metal hydroxide in an amount of no more than 5% by weight, 0.1 to 5% by weight, 0.1% to 1 by weight, or 0.3% to 0.6% by weight, based on the total weight of the aqueous solution.

Clause 50. The method of any one of clause 27 to clause 49, wherein the contacting the reactor with an aqueous solution of an alkali metal hydroxide comprises at least partially filling or substantially filling the volume of the reactor with the aqueous solution of alkali metal hydroxide.

Clause 51. The method of any one of clause 27 to clause 50, further comprising, after contacting the reactor with the aqueous solution of an alkali metal hydroxide, adding water to the reactor in an amount to fill at least 60% or at least 70% of the reactor volume and heating the water to boiling.

Clause 52. A system for producing polyether polyols, comprising: (a) a reactor; (b) a source of alkylene oxide in fluid communication with the reactor; (c) a source of alkali metal hydroxide catalyst in fluid communication with the reactor; (d) a source of amine initiator in fluid communication with the reactor; (e) a source of non-amine initiator in fluid communication with the reactor; (f) a water source in fluid communication with the reactor: (g) a source of a strong acid in fluid communication with the reactor; and (h) a source of an acidic metal conditioner in fluid communication with the reactor.

EXAMPLES

An ortho-toluenediamine-initiated polyether polyol (functionality of 4.0 and hydroxyl number of about 360 mg/KOH g) was prepared using a system as generally depicted by FIG. 1. The ortho-toluenediamine-initiated polyether polyol was prepared in reactor 12 and then discharged. Reactor 12 was filled with water to a level of about 75% with agitation and the water in reactor 12 was heated to boiling, e.g., to around 100° C. The boiling water was recycled to reactor 12 by passing via lines 80, 81 and 82 for 30 minutes. Thereafter, the water was emptied to wastewater via line 86. Reactor 12 was then opened and visually inspected. A high pressure spray water wash of reactor 12 was then conducted by spraying the inside of reactor 12 with 3500-5000 psi water via a hose inserted inside the manway of reactor 12. Then, reactor 12 was overfilled (reactor 12 was filled to a 100% level and then allowed to overfill into connected piping and equipment to ensure that the top head surface of reactor 12 and seals were all touched with water) with water and the water was agitated and heated to around 80° C. for about 2 hours. Thereafter, the water was emptied to wastewater via line 86.

A glycerine-initiated polyether polyol (functionality of 3 and hydroxyl number of about 28 mg/KOH g) was then prepared in reactor 12. The resulting polyol had a cloud point of 57.1° C., an alkalinity, determined by visual titration, of 0.94, and an APHA color of 200.

Following discharge of the glycerine-initiated polyether polyol, reactor 12 was charged with a water/dilute sulfuric acid solution (e.g. 1-2% sulfuric acid) to a level higher than the level of any product recipe used in reactor 12. Thereafter, the water/dilute sulfuric acid solution was emptied to wastewater via line 86.

Reactor 12 was then filled a level of about 25% with a mixture of water of Oakite® 33 (which is a mixture of phosphoric acid and 2-butoxyethanol), using a ratio of about 10 gallons of Oakite to 10,000 lb water. The mixture was heated to about 30-40° C. and circulated through the recycle loop and external heat exchanger (via lines 80, 81 and 82) for about 1 to 2 hours. Thereafter, the Oakite/water mixture was emptied to wastewater via line 86.

Reactor 12 was then filled with water to a level of about 75% with agitation and the water in reactor 12 was heated to boiling, e.g., to around 100° C. The boiling water was recycled to reactor 12 by passing via lines 80, 81 and 82 for 30 minutes. Thereafter, the water was emptied to wastewater via line 86.

A mixture of 45% potassium hydroxide (about 100 pounds) and water (about 10,000 pounds) was then charged to reactor 12 and mixed for about 30 minutes. The potassium hydroxide/water mixture was then emptied to wastewater via line 86.

Reactor 12 was then again filled with water to a level of about 75% with agitation and the water in reactor 12 was heated to boiling, e.g., to around 100° C. The boiling water was recycled to reactor 12 by passing via lines 80, 81 and 82 for 30 minutes. Thereafter, the water was emptied to wastewater via line 86. This process was repeated 2-3 times.

A glycerine-initiated polyether polyol (functionality of 3 and hydroxyl number of about 28 mg/KOH g) was then prepared in reactor 12. The resulting polyol had a cloud point of 60.0° C., an alkalinity, determined by visual titration, of 0.0984, and an APHA color of 20.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:
1. A method of removing amine contaminants from equipment used in the production of polyether polyols, comprising:
 (a) contacting the equipment with an aqueous solution consisting essentially of a first acid and water;
 (b) discharging the aqueous solution of the first acid from the equipment;

(c) following step (b), contacting the equipment with an aqueous solution of an acidic metal conditioner that is different from the aqueous solution of the first acid;

(d) discharging the aqueous solution of the acidic metal conditioner from the equipment;

(e) following step (d), contacting the equipment with an aqueous solution of an alkali metal hydroxide that is different from the aqueous solution of the acidic metal conditioner; and (f) discharging the aqueous solution of the alkali metal hydroxide from the equipment.

2. The method of claim 1, further comprising, prior to contacting the equipment with the aqueous solution of the first acid, substantially filling the equipment with water, heating the water to boiling, and then discharging the water from the equipment.

3. The method of claim 1, further comprising, prior to prior to contacting the equipment with the aqueous solution of the first acid, substantially completely filling the entire volume of the equipment with water and heating the water to a temperature of at least 60° C.

4. The method of claim 1, wherein the aqueous solution of the first acid comprises p-toluenesulfonic acid, sulfuric acid, hydrochloric acid, hydrobromic acid, nitric acid, trifluoroacetic acid, perchloric acid, or a mixture of any two or more thereof.

5. The method of claim 1, wherein the aqueous solution of first acid comprises acid in an amount of no more than 5% by weight, based on the total weight of the aqueous solution.

6. The method of claim 1, wherein alkali metal hydroxide is present in the aqueous solution of alkali metal hydroxide in an amount of no more than 5% by weight, based on the total weight of the aqueous solution.

7. The method of claim 1, further comprising, after contacting the equipment with the aqueous solution of an alkali metal hydroxide, adding water to the equipment in an amount to fill at least 60% of the equipment volume and heating the water to boiling.

8. The method of claim 1, wherein the first acid has a pKa of less than about −6.0 at 25° C.

9. The method of claim 1, wherein the aqueous solution of an acidic metal conditioner consists essentially of a weak acid, water, a surfactant, and, optionally a corrosion inhibitor.

10. The method of claim 1, further comprising, between steps (d) and (e), the steps of charging water to the equipment and discharging the water from the equipment.

11. The method of claim 1, wherein step (a) comprises contacting the equipment with an aqueous solution consisting of the first acid and the water.

12. The method of claim 1, wherein the polyether polyols comprise an amine-initiated polyether polyol and a non-amine initiated polyether polyol, wherein the amine-initiated polyether polyol and the non-amine initiated polyether polyol are prepared using an alkaline catalyst.

13. The method of claim 1, wherein the equipment comprises a reactor that produces amine-initiated polyether polyol and non-amine initiated polyether polyol.

14. The method of claim 13, wherein:
(1) the amine-initiated polyether polyol has a functionality of 2 to 6, a number average molecular weight of 200 Da to 12,000 Da, and a hydroxyl number of 300 to 500 mg KOH/g; and
(2) the non-amine initiated polyether polyol has a functionality of 2 to 8, a number average molecular weight of at least 700 Da, and a hydroxyl number of 28 to 150 mg KOH/gram.

15. The method of claim 1, wherein the acidic metal conditioner comprises an acid and a surfactant, wherein the acid comprises phosphoric acid, hydrofluoric acid, boric acid, or a mixture of any two or more thereof.

16. The method of claim 15, wherein the acidic metal conditioner is present in the aqueous solution of acidic metal conditioner in an amount of no more than 5% by weight, based on the total weight of the aqueous solution of acidic metal conditioner.

* * * * *

UNITED STATES PATENT AND TRADEMARK OFFICE
CERTIFICATE OF CORRECTION

PATENT NO. : 11,529,657 B2
APPLICATION NO. : 17/196075
DATED : December 20, 2022
INVENTOR(S) : Jenna Caputo et al.

It is certified that error appears in the above-identified patent and that said Letters Patent is hereby corrected as shown below:

In the Claims

Claim 3, Column 21, Line 18, should read as follows:
-- contacting the equipment with the aqueous solution --

Signed and Sealed this
Twenty-eighth Day of February, 2023

Katherine Kelly Vidal
*Director of the United States Patent and Trademark Office*